US006725126B1

(12) United States Patent
Doery

(10) Patent No.: US 6,725,126 B1
(45) Date of Patent: Apr. 20, 2004

(54) APPARATUS AND METHOD FOR MATCHED MAILING

(75) Inventor: Michael S. Doery, Monroe, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 10/256,312

(22) Filed: Sep. 27, 2002

(51) Int. Cl.[7] .................................................. G06F 7/00

(52) U.S. Cl. ........................ 700/221; 700/220; 700/227; 270/1.02; 270/1.03

(58) Field of Search ................................. 700/213, 219, 700/220, 221, 223, 224, 227; 270/1.02, 1.03

(56) References Cited

U.S. PATENT DOCUMENTS

| | | | | | |
|---|---|---|---|---|---|
| 4,733,856 | A | * | 3/1988 | Gunther, Jr. | 270/1.02 |
| 4,800,505 | A | * | 1/1989 | Axelrod et al. | 700/221 |
| 5,034,985 | A | | 7/1991 | Keough | |
| 5,179,522 | A | * | 1/1993 | Scribe | 700/221 |
| 5,207,412 | A | * | 5/1993 | Coons et al. | 270/1.02 |
| 5,317,654 | A | * | 5/1994 | Perry et al. | 382/101 |
| 5,547,175 | A | * | 8/1996 | Graushar et al. | 270/37 |
| 5,612,889 | A | * | 3/1997 | Pintsov et al. | 700/226 |
| 5,684,706 | A | * | 11/1997 | Harman et al. | 700/95 |
| 5,734,566 | A | | 3/1998 | Stengl | |
| 5,818,724 | A | | 10/1998 | Brewster, Jr. et al. | |
| 5,897,733 | A | * | 4/1999 | Stevens | 156/227 |
| 5,978,564 | A | | 11/1999 | Girardi et al. | |
| 6,173,274 | B1 | * | 1/2001 | Ryan, Jr. | 705/408 |
| 6,311,104 | B1 | * | 10/2001 | Shea et al. | 700/222 |

* cited by examiner

*Primary Examiner*—Khoi H. Tran
(74) *Attorney, Agent, or Firm*—Angelo N. Chaclas; Charles R. Malandra, Jr.

(57) ABSTRACT

In one embodiment the present invention comprises an apparatus for preparing a matched mailing, the apparatus comprising: an input means for feeding a document downstream to a scanner station; a scanner for scanning the document to obtain information, the scanner providing the information to a controller; an printer for printing information obtained from the controller onto the envelope, whereby the information obtained from the controller comprises information obtained by the scanner and corresponding to the document matched to the envelope.

15 Claims, 4 Drawing Sheets

APPARATUS AND METHOD FOR MATCHED MAILING

FIELD OF THE INVENTION

The invention disclosed herein relates generally to inserter systems which prepares documents for insertion into envelopes and, more particularly, to matched mailing systems for matching mailing envelopes and inserts.

BACKGROUND OF THE INVENTION

Systems have been developed for matched mailing. Matched mailing as defined herein means that items to be inserted into an envelope are matched with a particular envelope or with other documents. These matched mailings are used, for example, where a particular insert such as a letter is to be inserted into an opaque envelope (that is where the inserted letter does not serve as the address bearing document which is visible through a windowed portion of the envelope).

Inserts that are assembled to the collation at the insert feeder modules can be a generic inserts or specific inserts. The generic insert (advertisements, notices, business return envelopes, etc.) are of a general type that are not specifically directed to any particular addressee. Therefore, generic inserts serve each addressee equally well. On the other hand, specific inserts (canceled checks, invoice statements, etc.) contain unique information that is directed to a particular addressee. This is commonly referred to in the industry as matched mailing. In this case, specific inserts are only meaningful for the appropriate addressee and thus must be matched to each addressee.

In matched mail applications, a high degree of synchronization is typically incorporated into the inserter system to achieve proper operation. Such inserter systems have proven generally effective in producing large numbers of matched mailings. However, they have suffered from the disadvantage of a rigid and inflexible control system that does not recover well from events which occur that disturb the synchronization between the control document collation and the enclosure feeder modules.

One type of event that can disturb the synchronization is a jam. If a jam occurs, then the inserter system shuts down and operator intervention is required to correct the jam by removing the jammed collation. However, clearing of the jam could result in every control document following the jam being out of synchronization with the inserts.

In order to address this problem, current practice is to have the operator manually resynchronize the control documents with the enclosures. To accomplish this, the operator must use the jammed collation, which has been removed, to determine how many enclosures from each enclosure feeder module correspond to the jammed collation. This can be difficult since the control code that contains this information is in machine readable format and not human readable format. Once the operator determines this information, the operator manually removes the correct number of inserters from each insert feeder. Although this procedure will resynchronize the inserter system, it is time consuming, requires a highly skilled operator and is susceptible to human error.

In addition to synchronization difficulties described above, typical mail matching systems are capable of matching the contents of a mailing with the address printed on the envelope. To perform this matching a software program such as, for example, MS WORD produces a mail merge and prints through a proprietary driver and sends a data stream to the mail matching system. Information such as information directing printing of the envelope, addition of inserts, and configuration of the mailpiece is embedded in the data stream and is extracted by proprietary firmware that is part of the mail matching system. While the system works well, the design is expensive especially when dealing with technology changes. The data stream relies on a host PC to extract the address information from documents. Thus, the host application is coupled to the mail matching system and requires proprietary drivers.

Thus, one of the problems of the prior art is that a system is not available which can provide mail matching with simplified synchronization and recovery. Another problem of the prior art is that a system is not readily available which does not require proprietary drivers. Therefore, a matched mailing systems for matching mailing envelopes and inserts is needed which provides decoupling of a host application from the mail matching system.

SUMMARY OF THE INVENTION

This invention overcomes the disadvantages of the prior art by providing a system for preparing matched mailings. The system scans addressee data from documents that are to be inserted and sends the scanned addressee data to the envelope printer for printing on an appropriate mailpiece after the documents have been inserted. The system provides for decoupling of a host application from the mail matching system.

In one embodiment the present invention comprises an apparatus for preparing a matched mailing, the apparatus comprising: an input means for feeding a document downstream to a scanner station; a scanner for scanning the document to obtain information, the scanner providing the information to a controller; an printer for printing information obtained from the controller onto the envelope, whereby the information obtained from the controller comprises information obtained by the scanner and corresponding to the document matched to the envelope.

In another embodiment the present invention comprises a method for preparing a matched mailing, the method comprising the steps of: a) inputting a document into a mailing system; b) feeding the document downstream to a scanner station; c) scanning the document to obtain information; d) providing the information obtain by scanning to a controller; e) printing information from the controller onto the envelope, whereby the information obtained from the controller comprises information obtained by scanning and corresponding to the document matched to the envelope.

An advantage of the method of the present invention is that it decreases the need for time consuming re-synchronization after a jam. Other advantages of the invention will in part be obvious and will in part be apparent from the specification. The aforementioned advantages are illustrative of the advantages of the various embodiments of the present invention.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
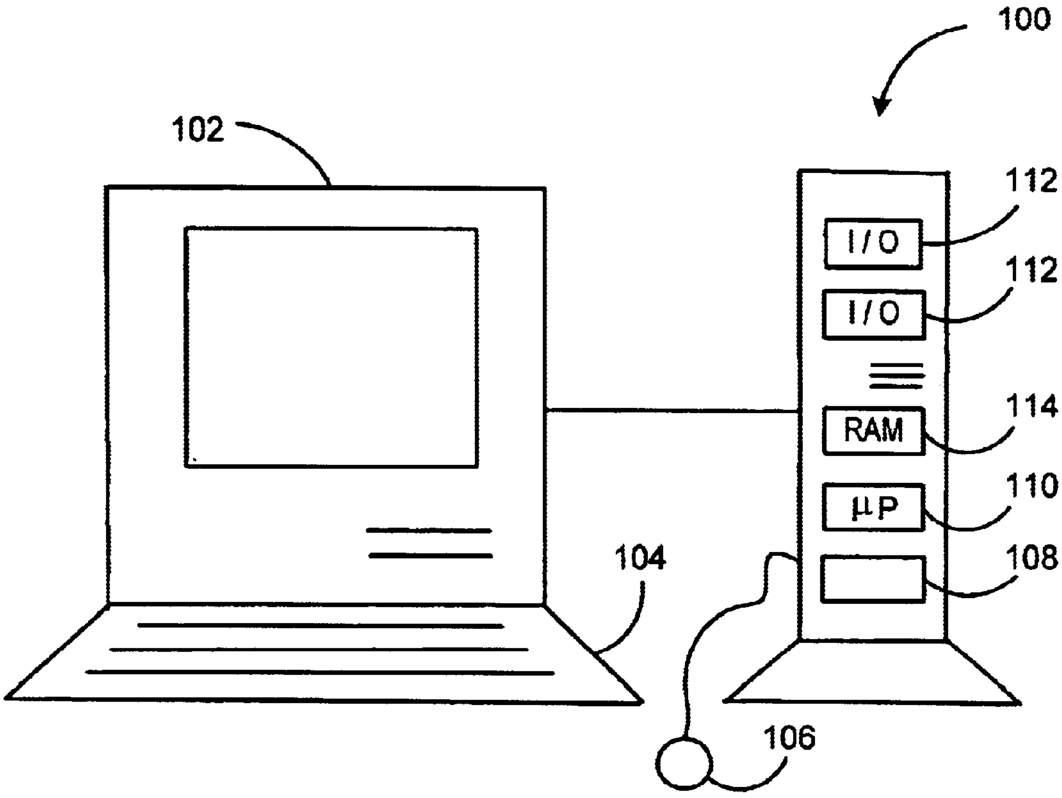
FIG. 1 is a block diagram that illustrates a computer system with which an embodiment of the invention may be controlled.

In describing the present invention, reference will be made herein to FIGS. 1–4 of the drawings in which like numerals refer to like features of the invention. Features of the invention are not necessarily shown to scale in the drawings.

Control Overview

FIG. 1 is a block diagram that illustrates a computer system 100, the use of which an embodiment of the invention may be implemented. Computer system 100 may be a personal computer which is used generically and refers to present and future microprocessing systems with at least one processor operatively coupled to user interface means, such as a display 102 and keyboard 104, and/or a cursor control, such as a mouse or a trackball 106, and storage media 108. The personal computer 100 may be a workstation that is accessible by more than one user. The personal computer also includes a conventional processor 110, such as a Pentium® microprocessor manufactured by Intel, and conventional memory devices such as hard drive 108, floppy or CDRW drive(s) 112, and memory 114.

Figure 2:
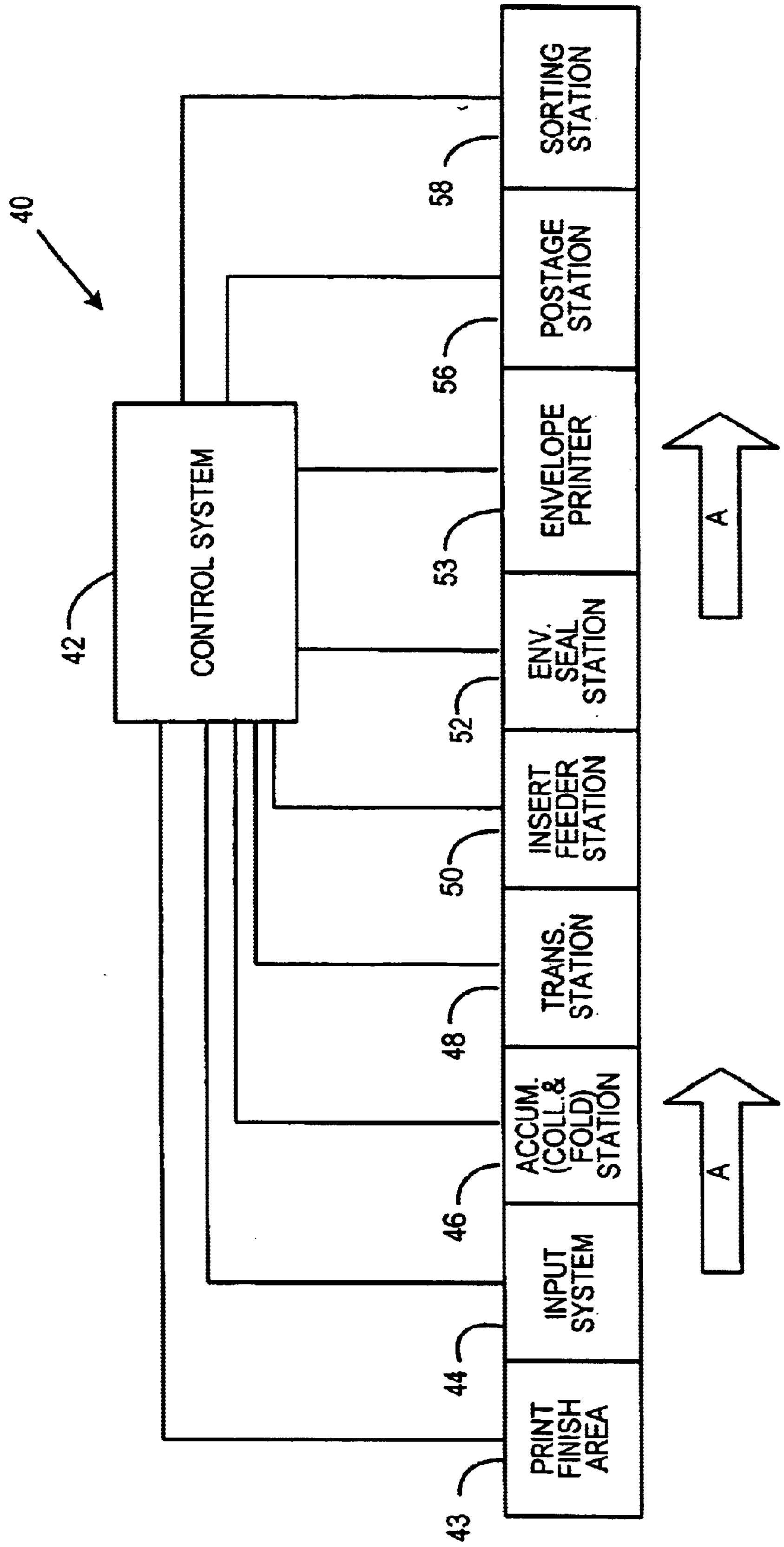
FIG. 2 is a block diagram schematic of a typical matched mail inserter apparatus.

The computer system 100 can be connected to a inserting apparatus such as a matched mail inserter apparatus as illustrated in FIG. 2. The control system 100 of the inserter system 40 may be the microprocessor based personal computer system 100 described above. The computer system 100 includes appropriate memory devices 108, 114 for storage of information such as an address database 22. One of ordinary skill in the art would be familiar with the general components of the matched mail inserter apparatus in which the present invention may be implemented. The use of the personal computer system within a matched mail inserter apparatus such as the embodiment illustrated in FIG. 3 could be accomplished by using the computer system 100 as the PC illustrated in FIG. 3 and also the control system 42 in FIG. 3. The control system 43 could be part of computer system 100.

Document Inserting System Overview

The edge detection apparatus of the present invention may be part of a document matched mail inserter apparatus 40 (the term matched mail inserter apparatus may be used herein interchangeably with the term inserter system). FIG. 2 is a schematic of a typical document inserting system, generally designated 40. In the following description, numerous paper handling stations implemented in inserter system 40 are set forth to provide a thorough understanding of the operating environment of the inserter. However it will become apparent to one skilled in the art that the present invention may be practiced without the specific details of these paper-handling stations.

As will be described in greater detail below, system 40 preferably includes a print finish area 43 (i.e. personal computer 43*a* and document printer 43*b*), an input system 44 that feeds paper sheets from a paper web or individual sheets S (shown in FIGS. 3 and 4) (not shown) to an accumulating station that accumulates which could include functionality such as, for example, collating and folding, the sheets of paper in collation packets (not shown). Alternate methods of inserting include printing the address on the insert document only and inserting such document into a window envelope which reveals the address, printing the documents in a print finishing 43 area upstream from the input system 44 of document inserting system 40 and feeding the documents directly to the input system 40 from the print finishing area 43.

Typically input system 44 feeds sheets in a paper path, as indicated by arrow A along a deck which is commonly called the main deck (not shown) of inserter system 40. After sheets are input, they are accumulated into collations and folded in collation/folding station 46. After the collations are folded they are conveyed to a transport station 48, preferably operative to perform buffering operations for maintaining a proper timing scheme for the processing of documents in inserting system 40.

Each sheet collation is fed from transport station 48 to insert feeder station 50. It is to be appreciated that a typical inserter system 40 includes a plurality of feeder stations, but for clarity of illustration only a single insert feeder 50 is shown. Insert feeder station 50 is operational to convey an insert (e.g., an advertisement) from a supply tray to the main deck of inserter system 40 so as to be nested with the aforesaid sheet collation being conveyed along the main deck. The sheet collation, along with the nested insert(s) are next conveyed into an envelope insertion station 52 that is operative to insert the collation into an envelope. Next, the envelope is fed to the envelope printer 53 which prints an address on the envelope. Since the present invention pertains to matched mail, the apparatus in the present example is described to be printing for a matched mail scenario. That is, the envelope contains specific enclosures directed to a particular addressee, and the printing of the envelope address needs to be synchronized with the contents of the envelope. This is commonly referred to in the industry as matched mailing. In this case, specific enclosures are only meaningful for the appropriate addressee and thus must be matched to each addressee. The control system 100 controls the synchronization function.

Next, the envelope is conveyed to the postage station 56 where appropriate postage is applied thereto. Finally, the envelope is conveyed to sorting station 58 that sorts the envelopes in accordance with postal discount requirements.

The use of the document inserting system 40, such as, for example, a Documatch™ Mail Matching System Systems manufactured by Pitney Bowes Inc. of Stamford, Conn., is well known. Such document inserting systems are used by organizations (e.g., banking institutions, utility companies, insurance companies, credit companies, and the like) for assembling large amounts of outgoing mailpieces for dispatch through the postal system. Typically, such organizations create documents, such as billing documents, in a computer such as a mainframe computer system (not shown) that is separate from the document inserting system 40 that will process the documents into such mailpieces. In the case where documents are created separate from the inserting system 40, they are fed into the inserting system 40 using a document feeder 42 (illustrated in the embodiment of FIG. 4).

Matched Mailing Apparatus of the Present Invention

Figure 3:
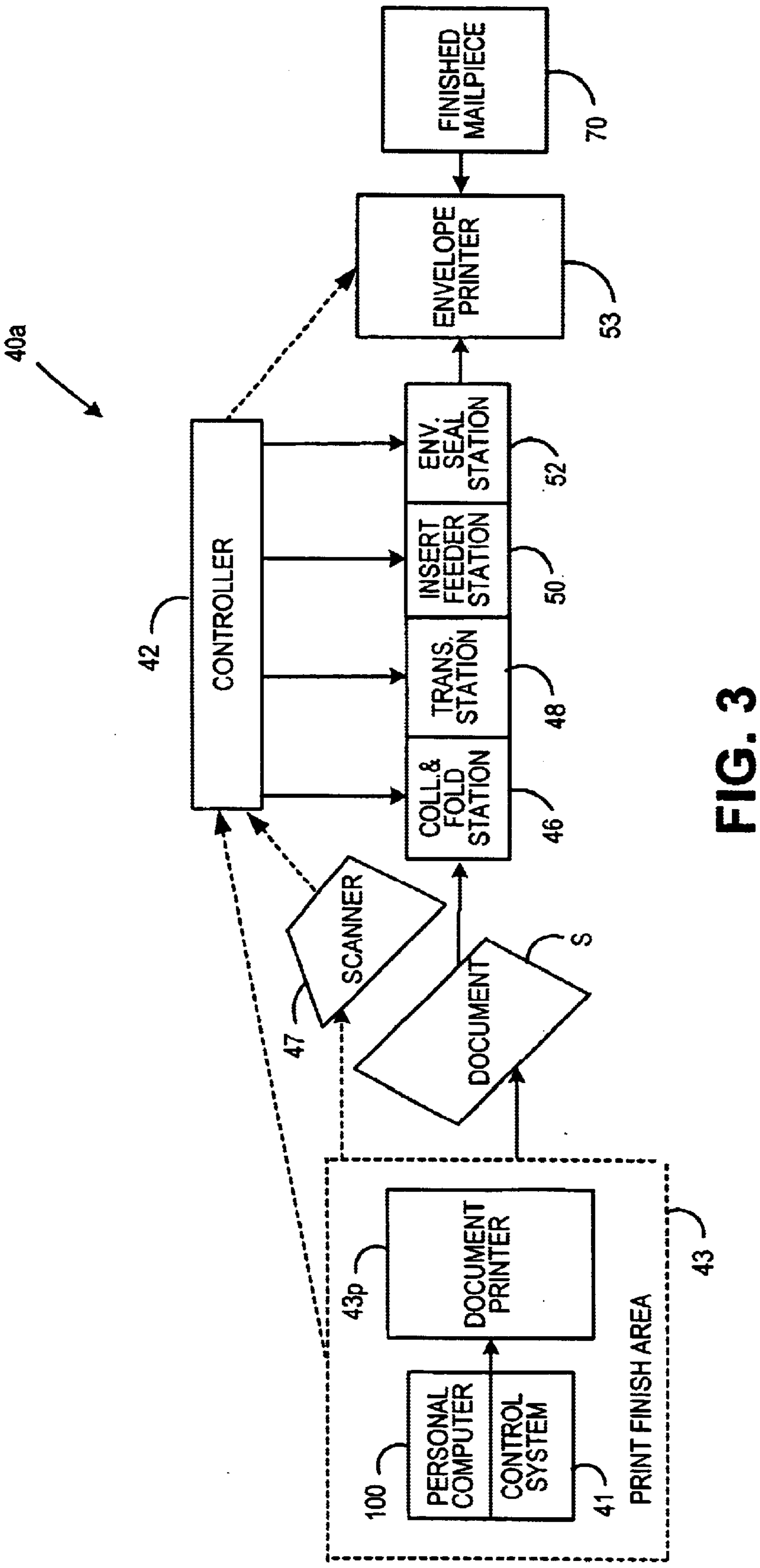
FIG. 3 is an embodiment of the present invention illustrating a matched mail inserter apparatus and the flow of a document through the apparatus.

With the general structure of inserter system 40 described above, a more specific description will now be given regarding a matched mail insertion station 40. The description details an embodiment that present invention to scan a printed document to obtain address information to be printed on a mailpiece. FIG. 3 is an embodiment of the present invention illustrating a matched mail inserter apparatus 40*a*. The apparatus 40*a* comprises a print finish area 43 which includes a document printer 43*p* and a personal computer 100 with a control system 42. Documents prepared in the print finish area are fed to an collation and folding 46 where the documents are accumulated and folded. After the collations are folded they are conveyed to a transport station 48, preferably operative to perform buffering operations for maintaining a proper timing scheme for the processing of documents in inserting system 40. The timing for the present invention could include timing needed to coordinate sending the scanned information from the scanner 47 to controller 42 and to envelope printer 53 to be printed once the envelope containing the document arrives at the envelope printer 53. It should be noted that the document scanner 47 would typically be configured to scan the document to contain the addressee for the envelope. However, other information could be scanned from the document for printing on the envelope.

Returning to the transport station 48, each sheet collation is fed from transport station 48 to insert feeder station 50. It is to be appreciated that a typical inserter system 40 could includes a plurality of feeder stations, but for clarity of illustration only a single insert feeder 50 is illustrated. Insert feeder station 50 is operational to convey an insert (e.g., a billing statement) from a supply tray to the main deck of inserter system 40 so as to be nested with the aforesaid sheet collation being conveyed along the main deck. The sheet collation, along with the nested insert(s) are next conveyed into an envelope insertion station 50 that is operative to insert the collation into an envelope. Next, at envelope sealing station 52, the envelope is moistened and sealed. Following sealing, the envelope is printed using envelope printer 53 and addressee information (and other desired information) scanned from the document D. The addressee information is conveyed to the envelope printer 53 by controller 42. Next, the inserted, printed matched mail is finished as is exemplified by finished mailpiece 70.

Figure 4:
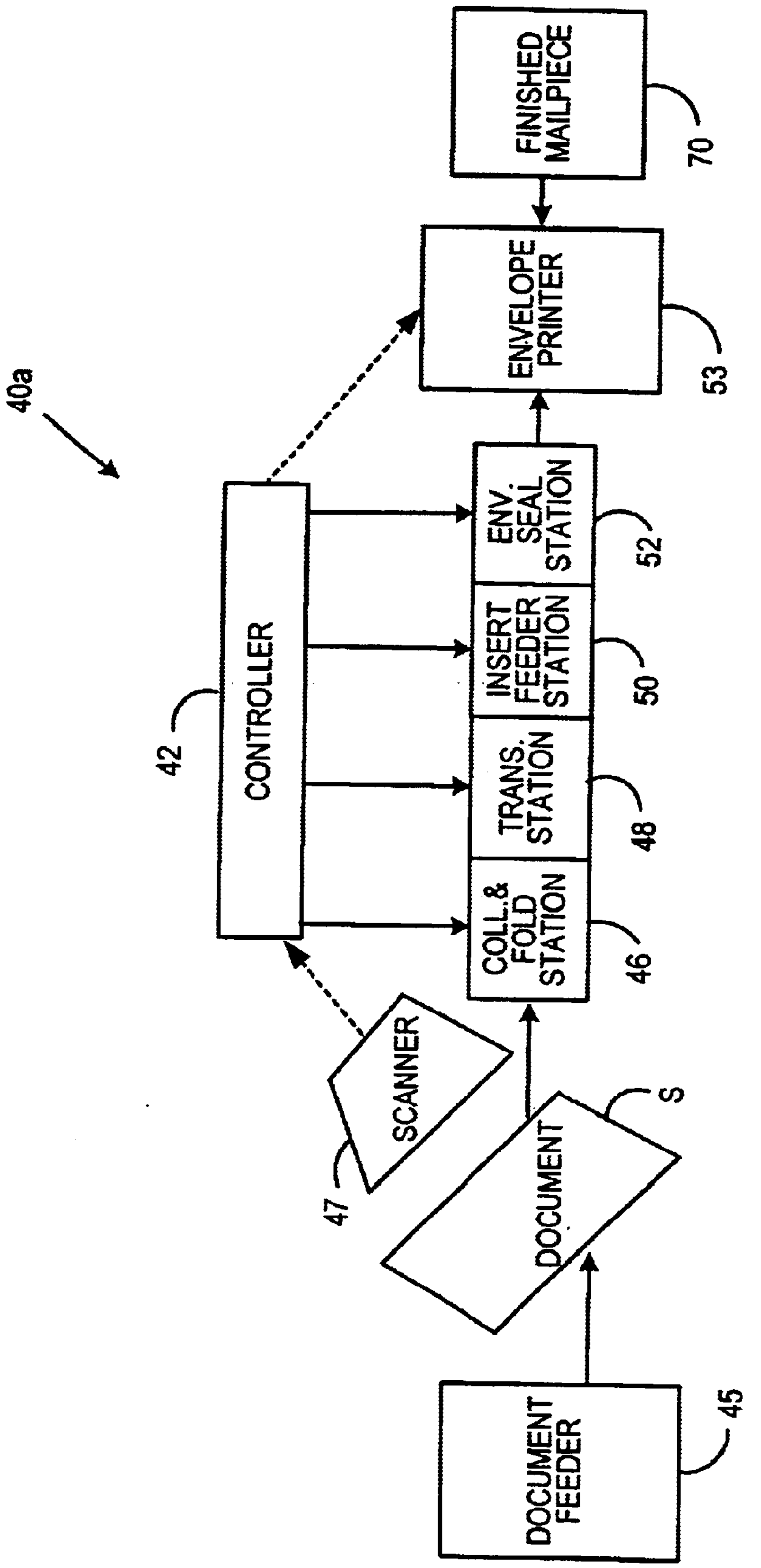
FIG. 4 is an alternate embodiment of the present invention illustrating a matched mail inserter apparatus and the flow of a document through the apparatus.

FIG. 4 is an alternate embodiment of the present invention illustrating a matched mail inserter apparatus. The embodiment of FIG. 4 is similar to the embodiment of FIG. 3 except that the print finish area 43 is replaced by a document feeder 43. Typically, organizations such as banks or utilities create documents, such as billing documents, in a computer such as a mainframe computer system (not shown) that is separate from the document inserting system 40 that will prepare the documents. In the case where documents are created separate from the inserting system 40, as in the present embodiment, the documents are fed into the inserting system 40 using a document feeder 42 (illustrated in the embodiment of FIG. 4).

Documents prepared and then placed in document feeder 42 are fed to an collation and folding 46 where the documents are accumulated and folded. After the collations are folded they are conveyed to a transport station 48, preferably operative to perform buffering operations for maintaining a proper timing scheme for the processing of documents in inserting system 40. The timing for the present invention could include timing needed to coordinate sending the scanned information from the scanner 47 to controller 42 and to envelope printer 53 to be printed once the envelope containing the document arrives at the envelope printer 53. It should be noted that the document scanner 47 would typically be configured to scan the document to contain the addressee for the envelope. However, other information could be scanned from the document for printing on the envelope.

Returning to the transport station 48, each sheet collation is fed from transport station 48 to insert feeder station 50. It is to be appreciated that a typical inserter system 40 could includes a plurality of feeder stations, but for clarity of illustration only a single insert feeder 50 is illustrated. Insert feeder station 50 is operational to convey an insert (e.g., a billing statement) from a supply tray to the main deck of inserter system 40 so as to be nested with the aforesaid sheet collation being conveyed along the main deck. The sheet collation, along with the nested insert(s) are next conveyed into an envelope insertion station 50 that is operative to insert the collation into an envelope. Next, at envelope sealing station 52, the envelope is moistened and sealed. Following sealing, the envelope is printed using envelope printer 53 and addressee information (and other desired information) scanned from the document D. The addressee information is conveyed to the envelope printer 53 by controller 42. Next, the inserted, printed matched mail is finished as is exemplified by finished mailpiece 70.

It should be noted that since not all documents have address information printed on them, a control page can be printed on a separate sheet that is fed prior to the insert document(s). The control page could be scanned to obtain the addressee or other desired information and then be diverted from the feed path prior to the insertion station. It should also be noted that while the embodiments described in the background and for FIGS. 3 and 4 detail printing on an envelope after insertion, the present invention is not meant to be limited to printing after insertion. Printing could be performed prior to insertion. One reasons to perform printing prior to insertion is when the document or insert is thick causing the envelope to be thick and difficult to print on. A reason for printing after inserting is that if the address and postage are printed after insertion this decreases the possibility of lost postage due to damage of an envelope as it moves along the feed path of the system.

Optical Scanner Technology Overview

Typical optical scanner technology includes the use of charge-coupled devices (CCDs) which can detect variations in light intensity and frequency. Other scanning technology includes drums scanners which rely on photomultiplier tube (PMT) technology. The more densely packed the CCDs are the better the resolution of the scanner. Flat bed scanners can include a linear array of CCDs in a bar configuration. The bar which also includes one or more light sources is moved across the material. Light is cast onto the material by the light source(s) and detected by the CCDs. The light sources typically are light emitting diodes (LEDs). Optical Character Recognition (OCR) software could be used to process the scanned image if in a particular embodiment information from the scanned image was desired for additional processing.

The embodiments described herein can provide the advantages by decoupling the host application from the mail matching system. While the present invention has been disclosed and described with reference to a various embodiments thereof, it will be apparent, as noted above that variations and modifications may be made therein. It is, thus, intended in the following claims to cover each variation and modification that falls within the true spirit and scope of the present invention.

What is claimed is:

1. An apparatus for preparing a matched mailing, the apparatus comprising:

an input means for feeding a document downstream to a scanner station;

a scanner for scanning the document to obtain information, the scanner providing the information to a controller;

a printer for printing information obtained from the controller onto the envelope, whereby the information obtained from the controller comprises information obtained by the scanner and corresponding to the document matched to the envelope; and wherein the printer prints a control page that includes control information, the control page being scanned prior to the document and subsequently diverted from a feed path.

2. The apparatus as claimed in claim 1 wherein the input means for feeding a document downstream to a scanner station comprises a document feeder.

3. The apparatus as claimed in claim 1 wherein the input means for feeding a document downstream to a scanner station comprises a print finishing area.

4. The apparatus as claimed in claim 3 wherein the print finishing area comprises a document printer and a control system for supplying address and insert information to the document printer.

5. The apparatus as claimed in claim 4 wherein the control system also supplies control data for printing on the document.

6. An apparatus for preparing a matched mailing, the apparatus comprising:

an input means for feeding a document downstream to a scanner station;

a scanner for scanning the document to obtain information, the scanner providing the information to a controller;

an inserter for inserting documents collected at the accumulation station into an envelope;

an envelope printer for printing information obtained from the controller onto the envelope, whereby the information obtained from the controller comprises information obtained by the scanner and corresponding to the document matched to the envelope; and wherein the printer prints a control page that includes control information, the control page being scanned prior to the document and subsequently diverted from a feed path.

7. The apparatus as claimed in claim 6 wherein the input means for feeding a document downstream to a scanner station comprises a document feeder.

8. The apparatus as claimed in claim 6 wherein the input means for feeding a document downstream to a scanner station comprises a print finishing area.

9. The apparatus as claimed in claim 8 wherein the print finishing area comprises a document printer and a control system for supplying address and insert information to the document printer.

10. The apparatus as claimed in claim 9 wherein the control system also supplies control data for printing on the document.

11. An apparatus for preparing a matched mailing, the apparatus comprising:

an input means for feeding a document downstream to a scanner station;

a scanner for scanning the document to obtain information, the scanner providing the desired information to a controller;

an accumulation station configured to accumulate documents, collate documents and fold the documents;

a transport station for providing a buffer zone to accommodate for processing time of the controller;

an inserter for inserting documents collected at the accumulation station into an envelope;

an envelope sealing station to seal the envelope containing the inserted documents; and an envelope printer for printing information obtained from the controller onto the envelope, whereby the information obtained from the controller comprises information obtained by the scanner; and wherein the printer prints a control page that includes control information, the control page being scanned prior to the document and subsequently diverted from a feed path.

12. The apparatus as claimed in claim 11 wherein the input means for feeding a document downstream to a scanner station comprises a document feeder.

13.The apparatus as claimed in claim 11 wherein the input means for feeding a document downstream to a scanner station comprises a print finishing area.

14. The apparatus as claimed in claim 13 wherein the print finishing area comprises a document printer and a control system for supplying address and insert information to the document printer.

15. The apparatus as claimed in claim 14 wherein the control system also supplies control data for printing on the document.

* * * * *